Aug. 29, 1933.  A. A. CONWAY  1,924,108

CLUTCH

Filed Feb. 20, 1930

Inventor
Alfred A. Conway
By Murray and Gugletter
Attorneys

Patented Aug. 29, 1933

1,924,108

UNITED STATES PATENT OFFICE 1,924,108

CLUTCH

Alfred A. Conway, Cincinnati, Ohio

Application February 20, 1930. Serial No. 429,903

5 Claims. (Cl. 192—69)

This invention relates to clutches of the character shown in the patent to Conway No. 1,745,079 of January 28, 1930. The invention relates to means for taking up wear between the various friction elements of the clutch and although the invention is exemplified as applied to a clutch of the indicated type disclosed in the said Conway patent, the invention is not restricted in its application to clutches of that specific type.

An object of the invention is to provide simple and positive means for securing the parts in adjusted positions.

Another object of the invention is to provide a device comprising a minimum of parts for attaining the indicated objective.

Another object is to provide a device that will permit adjustment of the parts and the clutch without necessitating the use of any specific instruments or tools, but the parts of which are so related that same will not disassociate with possible loss of adjustment.

These and other objects are attained by the means described herein and disclosed in the accompanying drawing, in which.

Figure 1:
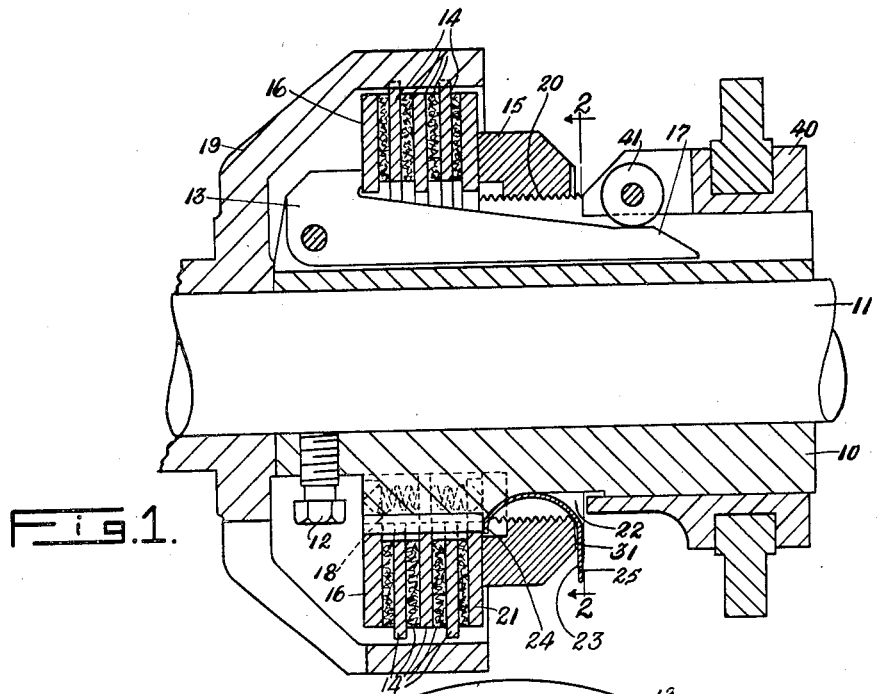
Fig. 1 is a longitudinal sectional view through a clutch showing the invention.
Figure 2:
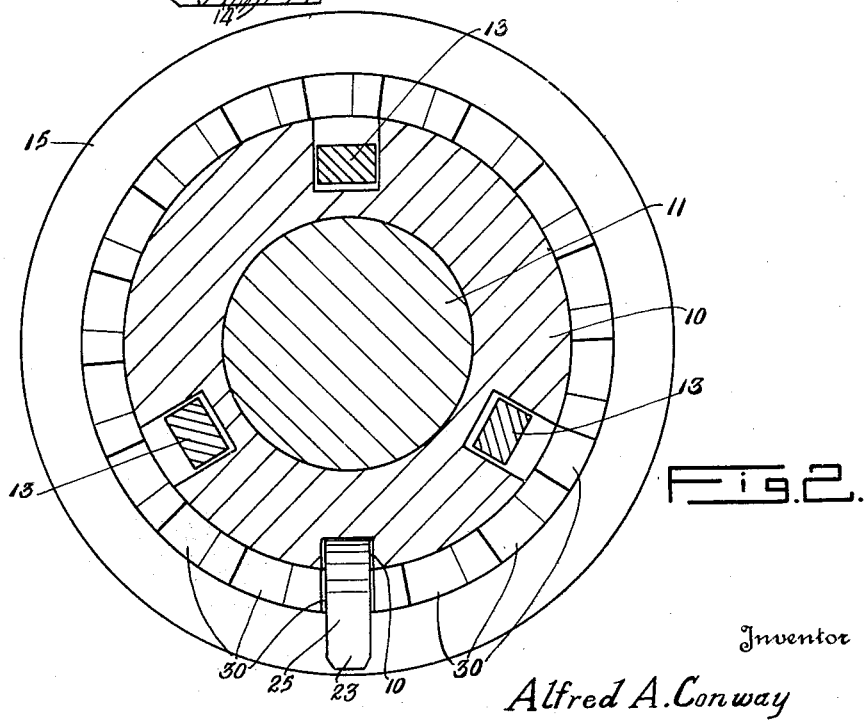
Fig. 2 is a sectional view on line 2—2 of Fig. 1.

The disclosure in Fig. 1 corresponds to the disclosure in Fig. 1 of the Conway Patent 1,745,079, wherefore no detailed explanation thereof is required. In a clutch of this character the member 10 is connected with the shaft 11 by means of set screw 12. Member 10 is provided with pivotally mounted pawls 13 that clamp the friction rings 14 between an abutment ring 15 and a clamping ring 16. Movement of the free end 17 of the pawl centerward of the clutch or toward the axis of shaft 11 serves to clamp the friction discs and suitable springs 18 yieldingly resist movement of the friction discs to operative or clamping position. A suitable housing or casing 19 is so connected with various of the friction discs 14 that clamping of the friction discs between the abutment 15 and ring 16 serves to transmit power from the shaft 11 to the member 19. It is to be understood that certain of the friction discs 14 are suitably connected with the member 10 for attaining the indicated driving relationship.

The abutment 15 has a threaded connection indicated at 20 with the member 10 and is adjusted longitudinally of the member 10 in order to take up wear of the friction discs. The abutment 15 bears against a pressure plate 21, and the pressure plate 21, similarly to certain of the friction discs, is splined to the member 10 so that the pressure plate 21 can not rotate independently of the member 10, although it has reciprocating motion along the member 10. The member 10 is provided with a slot 22 and there is received within the slot 22 a U-shaped clip 23. The clip 23 has its inner or shorter arm 24 secured to the pressure plate 21 in any suitable manner, for example, by spot welding thereto, and the longer or external end of the arm 25 of the clip 23 is exposed and accessible adjacent the abutment ring 15. The clip 23 is preferably of a metal having spring qualities such that it tends to enter suitable notches 30 provided in the end or face 31 of the abutment ring 15. When the outer or free end 25 of the spring clip is lodged within any one of the notches 30 the abutment ring 15 is precluded from rotary adjustment along its threaded connection 20. In the event that the ring is to be adjusted along the threaded connection, the free end 25 of the clip is flexed away from the ring 15 so that the clip clears the end face 31 of the ring 15, at which time the ring 15 may be rotatably actuated along the threaded connection 20 either for taking up wear or for withdrawing the ring 15 from its mounting upon the member 10. Upon release of the clip 23, it will find a seat in one of the notches 30 and secures the abutment 15 against independent movement relative to the member 10.

Suitable means are provided for actuating the pawls 13, for example, an actuator 40 provided with a roll 41 adapted to cooperate with the free ends 17 of the pawls 13. The actuator 40 may be slidably mounted upon the member 10.

What is claimed is:

1. In a clutch comprising a pair of cooperating clutch elements, the one of the clutch elements comprising a pair of relatively movable members for taking up wear on the clutch elements, one of said pair of movable members having a notch in it, and a strip-like spring clip attached to the other of said pair of movable members adjacent the inner portion of the notched member and adapted to enter flat into the notch to hold the members against relative movement, said members being relatively movable for effecting adjustment when the clip is withdrawn from the notch.

2. In a clutch the combination with a clutch member and splined means movable longitudinally of the member for rendering the clutch operative and inoperative, of an abutment plate rotatably adjustable relative to the clutch member for moving the abutment plate longitudinally of the member, the abutment plate having notches in its one face, and a strip-like clip attached to the splined means beneath the abutment plate and adapted to lodge flat in one of the notches for holding the abutment plate against rotary movement relative to the clutch member, the abutment plate being rotatably adjustable on unseating of the clip.

3. In a clutch the combination of a plurality of friction rings, a rotary member extending through the rings and having a slot formed at one of its ends, a notched abutment ring extending around said member and rotatably adjustable along the rotary member, a pressure plate between the abutment ring and friction rings and rotatable with the rotary member, means for clamping the friction rings and pressure plate against the abutment ring, and a strip-like spring clip comprising a pair of arms and extending into the slot in the rotary member, one arm being secured to the pressure plate and the other arm being yieldingly received in a substantially flat position in one of the notches in the abutment ring to hold the abutment ring against rotatable adjustment along the rotary member.

4. In a clutch the combination of a drive member, a driven member, sets of friction rings, each set having driving connection with one of the drive and driven members, a flat, annular abutment plate having an exposed radially extending face having spaced radial notches in its surface, the abutment plate having a threaded mounting on one of said members whereby rotation of the abutment plate causes movement of that plate longitudinally of said member, a plate splined to said member and extending radially from said member and interposed between the friction rings and abutment plate, a U-shape strip-like spring metal clip having one of its arms secured to said splined plate and having its base disposed centrally of the abutment plate whereby to dispose the second arm of the clip adjacent to and in substantial parallelism with the notched exposed face of the abutment plate, the last mentioned clip arm being adapted for selective entry into the notches for holding the abutment plate against independent rotary movement relative to the said one member, and means for clamping the sets of friction rings against the splined plate and the abutment plate.

5. In a clutch, a pair of cooperating clutch elements, one of said elements comprising a pair of relatively movable members for taking up wear on the clutch elements, one of the movable members being provided with notches, and a strip-like spring clip, attached to the other of said movable members and having the attached portions thereof enclosed by said first movable member, said clip projecting outwardly of the first movable member and adapted to releasably engage and substantially fill one of said notches for locking said movable members in adjusted positions relative to one another.

ALFRED A. CONWAY.